(12) United States Patent
Sohn

(10) Patent No.: US 9,581,144 B2
(45) Date of Patent: Feb. 28, 2017

(54) ARRANGEMENT FOR ADJUSTING A VALVE

(75) Inventor: Juergen Sohn, Esslingen (DE)

(73) Assignee: OTTO EGELHOF GMBH & CO. KG, Fellbach (DE)

( * ) Notice: Subject to any disclaimer, the term of this patent is extended or adjusted under 35 U.S.C. 154(b) by 1043 days.

(21) Appl. No.: 12/998,967

(22) PCT Filed: Dec. 10, 2009

(86) PCT No.: PCT/EP2009/008827
§ 371 (c)(1),
(2), (4) Date: Sep. 12, 2011

(87) PCT Pub. No.: WO2010/069508
PCT Pub. Date: Jun. 24, 2010

(65) Prior Publication Data
US 2011/0315903 A1 Dec. 29, 2011

(30) Foreign Application Priority Data

Dec. 18, 2008 (DE) .................. 10 2008 063 534
Mar. 10, 2009 (DE) .................. 10 2009 011 962

(51) Int. Cl.
*F03G 7/06* (2006.01)
*F16K 31/00* (2006.01)
*F16K 31/02* (2006.01)

(52) U.S. Cl.
CPC ............. *F03G 7/065* (2013.01); *F16K 31/002* (2013.01); *F16K 31/025* (2013.01)

(58) Field of Classification Search
USPC ...................................... 251/11; 60/527–529
See application file for complete search history.

(56) References Cited

U.S. PATENT DOCUMENTS 3,572,386 A * 3/1971 Sherwin ................. F02M 7/133
123/198 R
3,613,732 A * 10/1971 Willson et al. .......... 137/625.44
(Continued)

FOREIGN PATENT DOCUMENTS

DE         3140472 A1 *  5/1983
DE       19947324 A1 *  4/2001
(Continued)

*Primary Examiner* — Kevin Murphy
*Assistant Examiner* — Jonathan Waddy
(74) *Attorney, Agent, or Firm* — Kriegsman & Kriegsman

(57) ABSTRACT

The invention relates to an arrangement for adjusting a valve (12) which has a plunger (21) which is under the action of a restoring element (23) and has a valve closing member (18), having a housing (31) which can be attached to the valve (12) and in which is arranged at least one temperature-dependent actuating element (41) which interacts with an actuating device (34), by means of which actuating element (41) the actuating device (34) is activated so as to be movable between a rest position (57) and a working position, wherein the actuating element (41) is formed as at least one spring element from a shape-memory alloy, wherein the actuating device (34) is movable in the axial longitudinal direction of the actuating element (41) and the actuating element (41) extends substantially longitudinally with respect to the movement direction of the actuating device (34), and an air exchange is provided between an interior space (61) and an exterior space (65) of the actuating element (41) and an interior space and an exterior space of the actuating device (34).

11 Claims, 3 Drawing Sheets

(56) References Cited

U.S. PATENT DOCUMENTS

Figure 1:
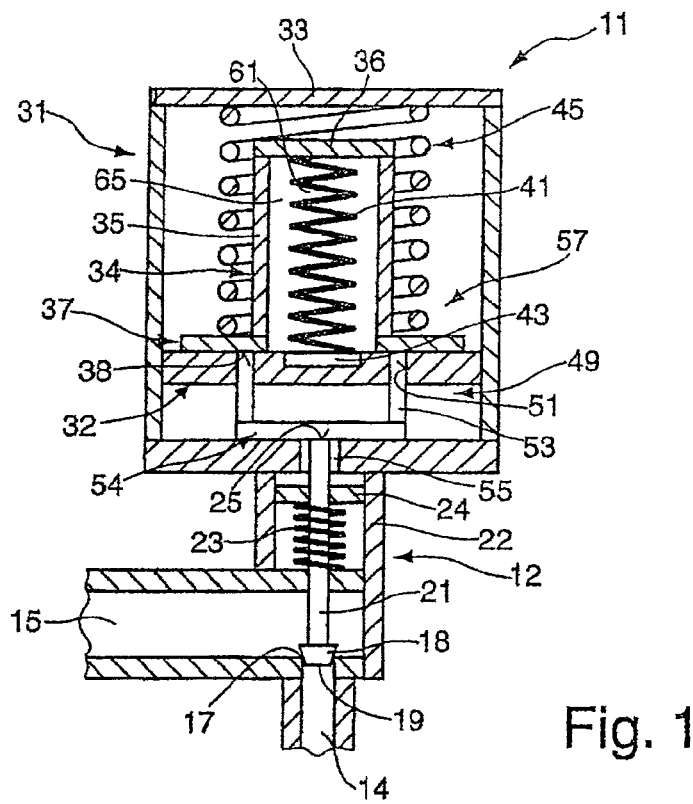

| | | | |
|---|---|---|---|
| 3,645,443 A | | 2/1972 | Willson et al. |
| 4,325,217 A | * | 4/1982 | Golestaneh ............. F03G 7/065 116/218 |
| 4,836,496 A | * | 6/1989 | Abujudom et al. ............ 251/11 |
| 4,841,730 A | * | 6/1989 | McDonald ...................... 60/527 |
| 4,899,910 A | * | 2/1990 | Tabei et al. ..................... 222/54 |
| 5,142,257 A | * | 8/1992 | Gamet .................. H01H 71/66 335/29 |
| 6,427,712 B1 | | 8/2002 | Ashurst |
| 6,892,538 B2 | * | 5/2005 | Park ................................ 60/602 |
| 8,205,855 B2 | * | 6/2012 | Li et al. .......................... 251/11 |
| 2005/0056799 A1 | * | 3/2005 | Malone ........................... 251/11 |
| 2009/0320463 A1 | * | 12/2009 | Jansen ............................ 60/527 |

FOREIGN PATENT DOCUMENTS

| | | |
|---|---|---|
| DE | 10 2005 045 432 A1 | 3/2007 |
| EP | 0 340 364 A1 | 11/1989 |
| GB | 2 056 677 A | 3/1981 |
| JP | 60 261374 A | 12/1985 |
| JP | 61 142980 A | 6/1986 |
| JP | 2003 042334 A | 2/2003 |
| JP | 2006 138235 A | 6/2006 |
| WO | WO 03/072939 A1 | 9/2003 |
| WO | WO 2009/004431 A1 | 1/2009 |

\* cited by examiner

ARRANGEMENT FOR ADJUSTING A VALVE

The invention relates to an arrangement for shifting a valve which has a valve closure member subjected to the action of a restoring member, said arrangement having a housing that is attachable to the valve and comprises a temperature-dependent actuating member that cooperates with an actuating device and by which said actuating device is activated so as to be movable, relative to the housing and in an axial direction of the valve closure member, between a starting position and a working position.

An arrangement of this type is used, for example, in the field of heating, ventilation, and air-conditioning. In addition, it may be used in all kinds of application in which a valve performing a valve movement is to be activated by said arrangement. Thus it is possible, for example, to modify, or even stop, the flow rate of a medium streaming or flowing through a tubing system. Valves of this type are capable, for example, of regulating the flow rate of liquid or gaseous media.

DE 31 40 472 C2 discloses an arrangement which is disposed in a housing attachable to a valve and comprises a pot-shaped actuating device in which a temperature-dependent expansion body is provided. This expansion body actuates a plunger of the valve. Such shifting movement of the plunger or of the valve closure member of the valve is caused by the fact that an electrical resistor acting as a heating element is disposed at the bottom of the actuating device and is abutted by a temperature-dependent expansion body. This temperature-dependent expansion body consists of a hermetically sealed metal pot wherein a material that changes its volume dependent on temperature, such as wax, for example, is disposed. Upon heating, a working piston disposed in said pot-shaped expansion body is pushed out and acts upon the plunger of the valve. When the plunger is in a starting position, i.e. when the expansion body has been allowed to cool, the valve may for example be closed.

This arrangement has the disadvantage that temperature-dependent expansion bodies of this type react very slowly when activated since, due to the end-face abutment of the electrical resistor element and due to the fact that the expansion body is made of wax, for example, a very long warm-up period is required for the latter to warm up, and expand, across its entire, pot-shaped cross-section. In addition, expansion members of this type require relatively large excess-travel springs in order to prevent the actuating device from suffering damage.

DE 10 2005 045 432 A1 discloses an arrangement for shifting a valve which provides a plunger subjected to the action of a return spring. A housing that is to be attached to a valve accommodates a temperature-depending actuating member cooperating with a working piston. The actuating member is shaped in the form of a deflectable disc and extends substantially crosswise with respect to the direction of movement of the plunger. This actuating member consists of a shape memory alloy. The actuating member permits to shift a working piston in the direction of movement of the plunger between two end positions, wherein upon heating, a first end position, i.e. a shape corresponding to the impressed shape memory, is occupied. This arrangement has the disadvantage that the actuating member extending crosswise with respect to the direction of movement requires a housing with a very large diameter or circumference. In addition, due to the fact that the warming-up is caused by a heating element disposed in the central region of the actuating member, said warming-up, permitting to achieve an actuating movement of the actuating member, takes place slowly and in an uneven manner.

The invention is therefore based on the object of providing a valve shifting arrangement of the type mentioned at the beginning which has a reduced construction volume, may be produced in a cost-effective manner and has a quick response behaviour in activating a valve closure member that is to be moved between a starting position and a working position.

This objective is achieved, according to the present invention, by means of an arrangement in which the at least one temperature-dependent actuating member is shaped in the form of at least one spring member made of a shape memory alloy, in which the actuating device is movable longitudinally in the axial direction of the actuating member, in which the actuating member extends substantially lengthwise with respect to the direction of movement of the actuating device, and in which an air exchange is made possible between an interior and an exterior of the spring member and an interior and an exterior of the actuating device.

By using the spring member made of a shape memory alloy, rapid activation for an actuating movement of the valve closure member may be achieved, since it is possible, with the operating points predetermined on the basis of the composition of the shape memory alloy, to achieve a phase change in the crystal structure and therefore a rapid reaction time combined with a high actuating force. Due to the configuration of the actuating member in the form of at least one spring member it is further possible, owing to the air exchange provided, to enable a uniform warming-up of the entire spring member, or the plurality of spring members, so as to activate an actuating movement for shifting between a starting position and a working position, such that heat accumulation in individual regions of the actuating member will not allow any unevenness in the change in structure of the shape memory alloy. This leads to a nearly uniform heating and cooling of the spring member(s).

By using the temperature-dependent actuating member in the form of a spring member made of a shape memory alloy, it is thus possible to achieve a compact design permitting to rapidly and precisely activate a valve.

According to a preferred configuration of the invention, provision is made for the actuating member or spring member to be realised in the form of at least one spiral spring or coil spring or in the form of at least one disc spring. The configuration of the spring member as a coil spring or a spiral spring makes it possible, by selecting the diameter of the wire and/or the diameter of the coil and/or the pitch of the coil, to adapt the required lifting forces in an easy manner to the actuating movement of the valve closure member. Alternatively, provision may be made for the spring member to be realised in the form of at least one disc spring or of at least one disc spring assembly. By choosing the disc spring with an appropriate size, shape, and material, it is equally possible to make a selection specifically adapted to the actuating forces. It will readily be understood that a combination of at least one coil spring and at least one disc spring or at least one disc spring assembly may also be selected for the configuration of the spring member. Furthermore, the spring member may consist of two or more coil springs having identical or differing shape memory alloys. The same may be true, by analogy, of the disc springs or disc spring assemblies. This makes it possible, for example, to activate a stepped actuating movement of the valve closure member. In addition, the configuration of the actuating member as a spring member extending preferably substantially along the direction of movement has the advantage of making it possible to achieve a housing with compact circumferential dimensions, while at the same time the configuration of the spring member permits to form a housing with a reduced length as compared to an actuating member comprising an expansion body.

According to a further preferred configuration of the invention, at least one heating element situated in the interior of the spring member or at least one heating element associated with an exterior of the spring member is provided which extends at least partially longitudinally in the axial direction of the actuating member. This configuration of the heating element permits to achieve a uniform temperature change of the actuating member as considered longitudinally in an axial direction, which enables shorter response times of the actuating member for valve activation. Preferably, provision is made for the heating element to extend within the spring member. Provision may be made, for example, for a heating element to extend from one end of the actuating member into the interior thereof. The same is true, by analogy, of the disposition of the heating element(s) with respect to the outer periphery of the spring member.

According to a further preferred configuration of the invention, provision is made for the one heating element that extends longitudinally in the axial direction or for the plurality of heating elements to have a total length which corresponds to at least one half of the length of the actuating member when in a starting position. In this way, a rapid response behaviour may be obtained. Provision is preferably made for the heating element to extend at least over a range of between one third and three-quarters of the length of the spring member when in a starting position. In some applications, the heating element(s) may extend almost over the entire length of the spring member when in a starting position, such that upon extension of the spring member in order to shift the actuating device from a starting position to a working position, the region of the spring member that is not associated with the heating element will equally be influenced sufficiently by the temperature change.

According to a further preferred configuration of the invention, the actuating member has a heating element provided on each end-face end thereof which extends at least partially in the direction of the opposite end-face end of the actuating member. This arrangement has the advantage that there is only a small region of the actuating member, formed between the end faces associated with each other, which is not disposed directly opposite a heating element, said gap region being capable of being bridged, as it were, almost entirely through thermal radiation exiting also in an axial direction, such that a quasi-uniform temperature input or temperature change may be achieved over the entire length of the actuating member.

According to a preferred configuration of the invention, the heating element extending longitudinally in the axial direction with respect to the actuating member is realised in a tubular, rod-shaped, or cage-like form. This makes it possible for the actuating member to be positioned coaxially with respect to the heating element, with the heating element being disposed in the interior of the actuating member or outwardly surrounding the actuating member, depending on the configuration of a given embodiment of the heating element. If the heating element is arranged on the outer periphery of the spring member, the heating element may preferably be realised as a sleeve having a plurality of apertures, so that an accumulation of hot temperatures in the interior of the heating element will not take place.

Furthermore, an electrical heating element, preferably in the form of a plate-shaped body, is provided on the bottom of the actuating device. It is thus possible for the actuating member to have its end face directly abutted against a heating element.

Furthermore, an electrical heating element may be provided on a housing portion separating the interior of the housing and may preferably have a plate-shaped body. This will equally allow the actuating member to be directly abutted against the electrical heating element.

Furthermore, there may preferably be provided at least one of a combination of heating elements arranged on the bottom of the actuating device and a heating element arranged on a housing portion separating the interior of the housing and a heating element arranged coaxially with respect to the actuating member and extending longitudinally in an axial direction with respect to the spring member.

According to a further preferred configuration of the invention, provision is made for the electrical heating element to be realised in the form of an electrical resistor, in particular a PTC resistor heating. Heating elements of this type may be activated in an easy manner and may enable controllable temperature changes.

According to a further preferred configuration of the invention, provision is made for a plate-shaped heating element to be formed as an electrical resistor, in particular a PTC resistor, in order to activate an actuating movement of the actuating member, and provision is further made for at least one heating element arranged thereon, in particular a tubular, rod-shaped, or cage-like heating element, to be formed from a thermally conductive material. An arrangement of this type enables a cost-effective configuration. The plate-shaped heating element warms up the tubular, rod-shaped, or cage-like heating element, as they are configured with a thermally conductive material, such that a uniform warming-up along the actuating member may take place, with the possibility for the rod-shaped heating element to extend inside and/or outside of the actuating member. The thermally conductive material used for the tubular, rod-shaped, or cage-like heating element may, for example, be copper or the like.

According to a preferred configuration, provision is made for the actuating device to be realised in a cage-like form and to preferably have a thrust rim which faces towards the housing portion and which abuts against the housing portion and forms a supporting surface for a plunger, a valve closure member or a thrust member disposed therebetween when the actuating member is in a starting position. By this pot-shaped configuration of the actuating member with a thrust rim, which at the same time comprises a thrust rim as a contact surface on the housing portion, the actuating member is allowed to be accommodated within the actuating device and to be securely positioned therein. In addition, the at least one heating element may equally be securely disposed within the actuating device. This enables a simple and compact structure in which the individual components of the assembly are nested within each other, or rather are disposed coaxially with respect to each other. One contact surface of the valve closure member may thus be directly applied to the thrust rim. Alternatively, the thrust rim may be in connection with a thrust member which cooperates with a contact surface of the valve closure member. Owing to the cage-like configuration of the actuating device, local heat accumulation is prevented.

According to a further preferred configuration of the invention, provision is made for the restoring device to be realised as a spiral spring, acting between the housing cover and the thrust rim of the actuating device. Thus, the restoring device may again be arranged coaxially to the actuating member and an axial extension of the arrangement may be reduced. In case it should be necessary for the arrangement to be thinner in circumference, the restoring device may be provided between the housing cover and the bottom of the actuating device. This, however, will lead to an increase in the overall axial length. As an alternative to the restoring device in the form of a spiral spring, the restoring device may be realised as at least one disc spring, acting between a housing cover and a bottom of the actuating device. Furthermore, provision may alternatively be made for the restoring device to consist of a combination of at least one spiral spring and at least one disc spring, which may, in addition, be formed from different shape memory alloys.

According to a further preferred configuration of the invention, a restoring device is provided within the housing which acts between a housing cover and the actuating device and preferably disposes the actuating device in a starting position while the actuating member is in an idle state. A configuration of the arrangement of this type is preferably provided for a valve which is open when in a normal position. During the mounting of the arrangement for shifting the valve, the valve closure member is transferred to a closing position. The restoring device causes the valve closure member to be held in a starting position. For opening the valve, the actuating member is activated which, with the assistance of the restoring member present on the valve closure member, works against the restoring device and opens the valve closure member, depending on the supply of current to the heating element(s).

According to a further preferred embodiment of the invention, provision is made for the housing portion traversing the interior of the housing to have at least one through hole through which a thrust member extends or through which a contact surface of the valve closure member may be passed. Due to said at least one through hole, a connection between the valve closure member and the thrust rim of the actuating device may be provided, such that the lifting movement of the actuating device caused by the actuating member may be transmitted either indirectly, i.e. via the at least one thrust member, or directly to the valve closure member. Depending on the connection situation or on the installing situation, the thrust member may in particular be configured with a thrust plate to be applied to the support surface of the valve closure member so as to dispose the latter in one of a closed and an open position.

In a further preferred configuration of the invention, provision is made for an activatable closing force of the actuating member for closing a valve closure member, which is open when in a starting position, to be greater than a restoring force of the restoring member acting on said valve closure member. A configuration of the arrangement of this type is provided in cases in which the valve to be actuated is basically in an open position when in a starting position and the arrangement is designed to be activated so as to cause a closing movement of the valve closure member. In this arrangement the need for an additional restoring device can be obviated, thus enabling an adaptation of the actuating member for activating the valve closure member, depending on the restoring member for the closing movement.

According to an alternative configuration of the invention, provision is made for an activatable opening force of the actuating member to be greater than the sum of the restoring force of the restoring device and the actuating force of the restoring member acting in the opening direction. Thus, it may be achieved that once the arrangement has been installed on the valve, the valve closure member is shifted to, and held in, an open position at least after the first supply of current to the heating element. It is thus possible, by activating the arrangement, to specifically set both the opening instant and the degree of opening.

According to a further preferred configuration of the invention, a gap is provided between the housing cover and the housing portion traversing the interior space, said gap comprising the height of the actuating device plus at least the distance one lifting travel thereof, such that on transferring the actuating device from a starting position to a working position an opening and closing of the valve may be activated. It may thus be ensured that in the embodiment in which the valve closure member is held closed when in a starting position as well as in the embodiment in which the valve closure member is held open when in a starting position, a sufficient lifting movement may be provided so that a transfer to the respective working positions may take place.

Figure 2:
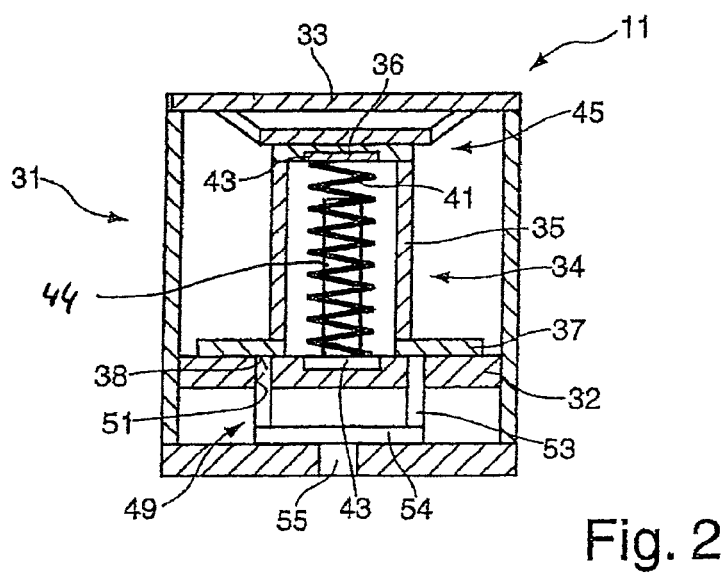
Figure 3:
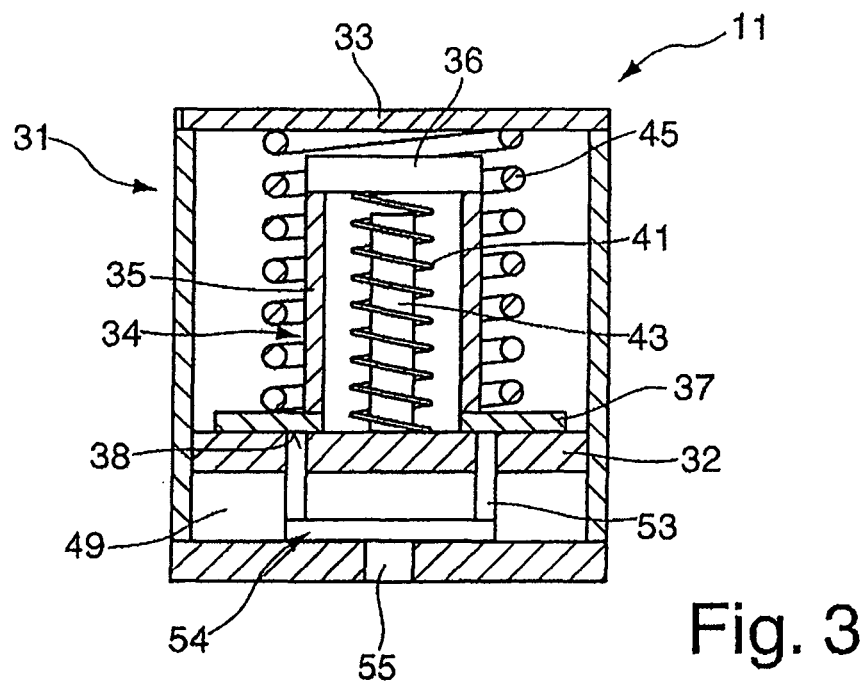
Figure 4:
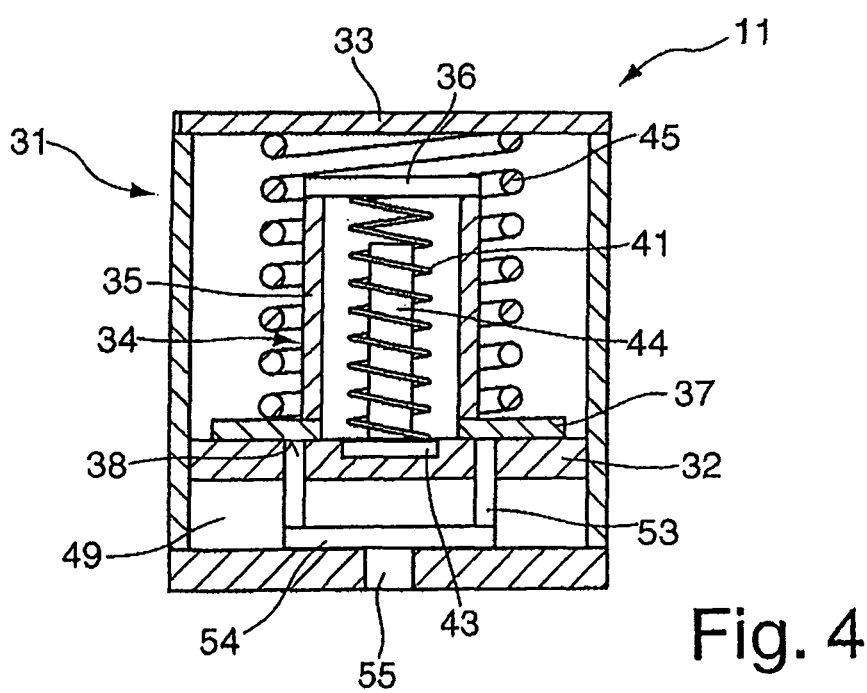
Figure 5:
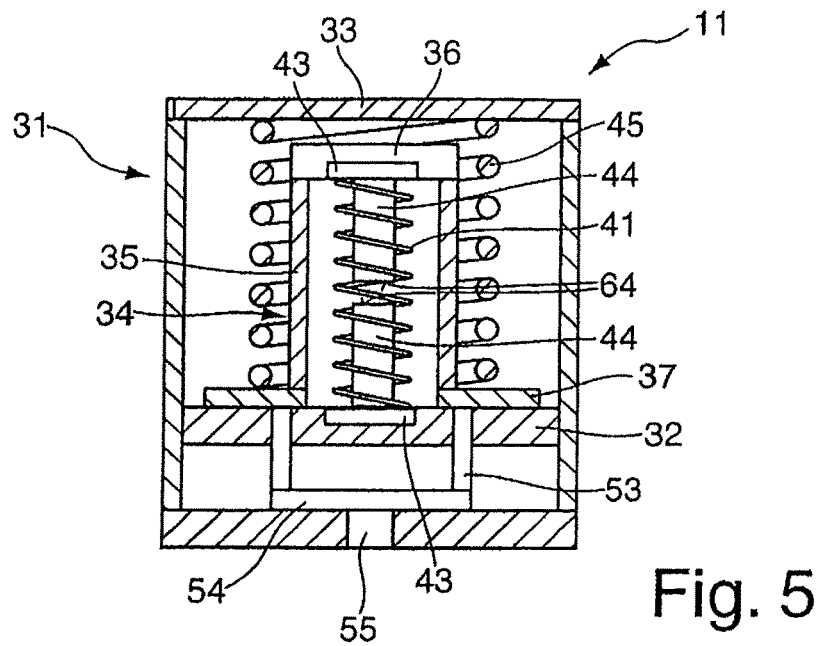
Figure 6:
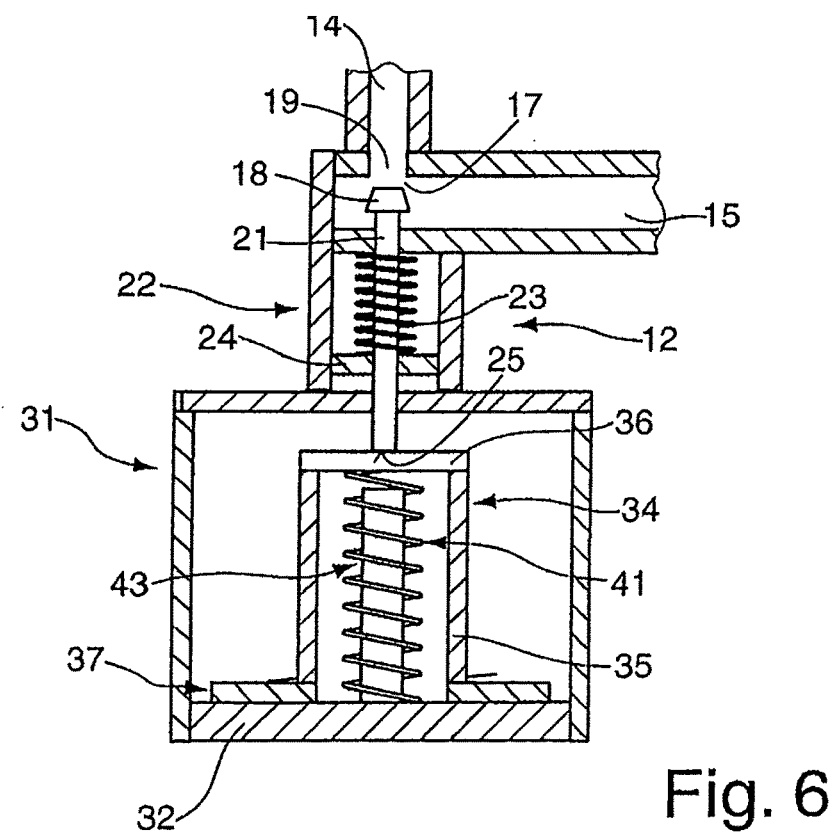

The invention, as well as other advantageous embodiments and developments thereof, will be described and explained in the following with reference being made to the examples shown in the drawings. The characteristics issuing from the description and the drawings may be applied according to the present invention either individually or as a plurality of features taken in any combination. In the drawings:

FIG. 1 is a schematic sectional view of an arrangement according to the invention connected to a valve, FIG. 2 is a schematic sectional view of an alternative embodiment of the arrangement according to FIG. 1, FIG. 3 is a further alternative configuration of an arrangement according to FIG. 1, FIG. 4 is a schematic sectional view of a modified embodiment of the arrangement differing from that of FIG. 3, FIG. 5 is a schematic sectional view of a modified embodiment of the arrangement differing from that of FIG. 3, and FIG. 6 is a schematic sectional view of a further alternative configuration of the arrangement for shifting an alternative valve, differing from that of FIG. 1.

FIG. 1 represents a schematic sectional view of a first embodiment of an arrangement 11 which is attached to a valve 12. The valve 12 comprises a feed opening 14 and a discharge opening 15. Between these, a valve seat 17 is provided which cooperates with a valve closure member 18 to open and close a passageway 19 between the feed opening 14 and the discharge opening 15. The valve closure member 18 comprises a plunger 21 which protrudes from a valve box 22. In the valve box 22, a restoring member 23 is provided which is applied to a stop 24 attached to the plunger 21 and which abuts against the valve box 22. This valve 12 is open when in a starting position and when no arrangement 11 is arranged thereon.

The arrangement 11 comprises a housing 31 which is attachable, for example by means of a screw connection or clamping connection not represented in greater detail, to the valve box 22. In the housing 31, a housing portion 32 is provided which extends at least partially into the interior of the housing 31. Preferably, the housing portion 32 is realised as a continuous housing plate comprising mountings or holes for accommodating respective functional units, corresponding to the configuration of the arrangement 11. Between the housing portion 32 and a housing cover 33, an actuating device 34 is provided which comprises a pot-shaped body. This pot-shaped body is realised in a cage-like form or has apertures formed at least in the region of its cylindrical or conical peripheral wall 35. The actuating device 34 comprises a bottom 36. The latter may equally have apertures formed therein or may be realised as a grid. Opposite thereto, a thrust rim 37 is provided which comprises a supporting surface 38 that is rested on the housing portion 32.

The actuating device 34 has at least one actuating member 41 disposed therein which is made of a shape memory alloy. Shape memory alloys (which are also referred to as SMA's) may consist, for example, of a TiNi alloy, an alloy based on Cu, Fe, or the like, or of a shape memory plastic. Theses shape memory alloys may be designed in a manner so as to perform a lifting movement which starts at a predetermined temperature value, such that their opening and closing movements may be set to take place exactly at a given point in time. In addition, it is possible, via the cross-section and/or the wire thickness of the spring member and via the selection of the material and the geometry thereof and/or its pitch, to select and set the opening and/or closing force and thus the opening and/or closing time. This actuating member 41 is realised as a spring member. According to a first embodiment, for example, a spiral spring or a coil spring is provided which is applied, on the one hand, to the bottom 36 of the actuating device 34 and, on the other hand, to the housing portion 32. Alternatively, a plurality of identical or non-identical spring members arranged in series may be provided which may differ from one another in the configuration of their shape memory alloys as well as in their spring rates.

Inside the housing portion 32, an electrical heating element 43 is provided which preferably has a flat extension, such that an end-face end of the actuating member 41 is preferably applied all-over to the heating element 43. The heating element is realised as an electrical resistor, preferably a PTC resistor, which is connected via a supply line not shown in greater detail to a power source or voltage source not shown in greater detail either.

Outside of the actuating device 34 a restoring device 45 is provided which in this embodiment is realised in the form of a coil spring. This restoring device 45 is applied, on the one hand, to the housing cover 33 and, on the other hand, to the thrust rim 37 of the actuating device 34. On the side opposite to the restoring device 45, a thrust member 49 is applied to the supporting surface 38 of the thrust rim 37, said thrust member being passed through a through hole 51 formed in the housing portion 32. According to this embodiment, said thrust member 49 comprises at least two thrust pins 53 accommodating a thrust plate 54. This thrust plate 54 covers an opening 55 formed in the housing 31 into which the plunger 21 protrudes.

When the actuating device 34 is in a starting position 57, the thrust rim 37 is applied to the housing portion 32. This is caused by the fact that the actuating force of the restoring device 45 is greater than the actuating force of the actuating member 41 when in an inactive condition combined with the restoring force of the restoring member 23. Thus, the valve closure member 18 may be held in a closed position.

For selecting a predefined flow rate of a gaseous or liquid medium to pass through the passageway 19, the heating element 43 is energised, so that the at least one actuating member 41 warms up. Owing to the phase change in the shape memory alloy, a change in the length of the at least one actuating member 41 is thus caused, acting against the restoring device 45. The actuating device 34 is thus moved towards the housing cover 33. The thrust member 49 which may either be firmly or loosely connected to the thrust rim 37 of the actuating device 34 is equally moved upwards together with the valve closure member 18, due to the actuating force of the restoring member 23, such that the valve 12 will open. Via a displacement measuring device not represented in greater detail the supply of current to the heating element 43 may be stopped as soon as a predefined actuating displacement or lifting movement of the valve closure member 18 has taken place. This is followed by a closing movement of the valve closure member 18, which is due to a temperature change, i.e. a cooling, and which lasts until the passageway 19 is completely closed again. Subsequently, the heating element 43 is again energised, as needed, for a predetermined period of time, so that the valve will open again. In this manner, the valve 12 may be held in an opened condition by utilising only a minimum of electrical driving power. The pulse width depends on the thermal masses and on the hysteresis of the actuating member 41 made of a shape memory alloy.

As an alternative to the arrangement represented in FIG. 1, provision may be made for the thrust member 49 to be omitted altogether and for a contact surface 25 on the plunger 21 to be applied directly to the thrust rim 37 of the actuating device 34. Power input to the valve closure member 18 may also take place in another manner than through the centre.

FIG. 2 represents an alternative configuration of the arrangement 11, differing from FIG. 1. As far as the coinciding features are concerned, reference is made to FIG. 1. The difference of the arrangement 11 in FIG. 2 lies in the fact that the restoring device 45 is not realised in the form of a coil spring but in the form of disc spring. Alternatively, a plurality of disc springs stacked upon one another or disc spring assemblies may be provided.

Alternatively, the gas-filled or liquid-filled expansion elements or wax expansion elements may be used, following the same installation method. Liquid-filled or gas-filled expansion elements are realised as bellows bodies or membrane bodies, for example, and are mostly cylindrical in shape. The top and bottom end faces are realised as contact surfaces and are equally heatable. When wax expansion members are used, a pot-shaped or cylindrical main body is usually provided which is filled with some wax or the like which upon heating to a predetermined temperature will undergo a phase change from a solid state to a liquid state. This change in volume is transmitted via a ram or punch guided within the housing. Thus, a wax expansion element of this type may equally be installed and inserted into the existing arrangement instead of an actuating member realised in the form of a spring member.

Furthermore, in this embodiment there is a heating element 43 provided in the housing portion 42 as well as in the bottom 36 of the actuating device 34. Thus, the heating of the actuating member 41 may take place from both end faces. Alternatively, a heating element may be provided only in the bottom 36 of the actuating device 34.

FIGS. 3 to 5 represent an alternative embodiment of the arrangement, differing from that of FIG. 1. This embodiment differs from that shown in FIG. 1 only in the configuration of the heating element(s) 43. Apart from that, reference is made to FIG. 1.

In the embodiment according to FIG. 3, the heating element 43 is realised in the form of an electrical resistor, is shaped in tubular or rod-shaped form, and extends longitudinally in an axial direction with respect to the actuating member 41, preferably in the interior 61 of the actuating member 41. The connections of the heating elements 43 are supplied preferably via the housing portion 32. This heating element 43 extends over an essential portion of the length of the actuating member 41. Thus, the entirety of the actuating member 41 may be heated simultaneously. This enables in particular a rapid response behaviour of the actuating member 41 which, in turn, causes a rapid opening of the valve 12. Owing to the coaxial arrangement 11 of the actuating member 41 and the heating element 43, it is possible to provide an arrangement 11 having a housing 31 with compact circumferential dimensions. In addition, this arrangement may also provide a compact design in the axial direction.

The peripheral wall 35 of the actuating device 34 comprises a plurality of through holes, apertures, or the like, such that a uniform heating and cooling of the air within the housing 31 is enabled. Thus, partial heating of the actuating member 41 due to accumulated heat is prevented and rapid cooling by convection is ensured.

As an alternative to the arrangement represented in FIG. 3, the heating element 43 may be mounted at the bottom 36 of the actuating device 34.

FIG. 4 represents an embodiment of the arrangement 11 differing from that of FIG. 3. This embodiment is modified in so far as a plate-shaped heating element 43, which has been described in FIG. 2, is combined with a rod-shaped or tubular heating element 44 which may consist, for example, of a thermally conductive material. As an alternative, this arrangement of the heating elements 43, 44 may be provided at the bottom 36 of the actuating device 34. Alternatively, a rod-shaped or tubular heating element 44, which has been described in accordance with FIG. 3, may be provided instead of the heating element 44 made of a thermally conductive material. Likewise, a plate-shaped heating element 43 may be provided at the bottom 36 of the actuating device 34 and the tubular or rod-shaped heating element 44 according to FIG. 3 may be provided on the housing portion 32. An inversion of this configuration is also envisageable.

FIG. 5 represents a further alternative embodiment, differing from those of FIGS. 3 and 4. In this embodiment of the arrangement 11, a plate-shaped heating element 43, by analogy with FIG. 2, is provided, for example, on each of the housing portion 32 and the bottom 36 of the actuating device 34, respectively, combined with a rod-shaped or tubular heating element 44 arranged in accordance with FIG. 4. These tubular heating elements 44 protrude into the interior 61 of the actuating member 41. The respective end-face ends 64 of the heating elements 44 facing towards each other are positioned at least with a small distance with respect to each other. As an alternative to the tubular or rod-shaped heating elements 44, a tubular or rod-shaped heating element 43 may be provided, as is described in FIG. 3.

The embodiments described in FIGS. 3 to 5 and their alternatives may be modified in that the at least one tubular or rod-shaped heating element 43, instead of being positioned in the interior 61 of the actuating member 41, may be associated with an exterior 65 of the actuating member 41 which is formed between the peripheral wall 35 of the actuating device 34 and the actuating member 41. In order to avoid accumulated heat, in this embodiment at least one heating element 43 is provided with a sufficient number of appropriately sized apertures.

In the interior 61 as well as in the exterior 65 one or a plurality of heating element(s) 43 and/or heating element(s) 44 may be provided, the latter being in connection with the plate-shaped heating elements 43.

The liquid-filled or gas-filled expansion members or wax expansion members may be adapted for installation in, and use with, the two above-mentioned design variants of FIGS. 3 to 5. On the one hand, the heating element 43 may be sleeve-shaped and may surround the expansion member(s), on the other hand, the expansion member(s) may have a housing with one or several recess(es) into which the heating element(s) 43 protrude or may be inserted so as to warm up the expansions member(s) from the inside.

FIG. 6 represents an alternative embodiment differing from FIG. 1. This embodiment comprises a valve 12 which is open when in a starting position. The arrangement 11 acting upon the valve 12 differs with respect to the embodiment according to FIG. 1 in that the need for a restoring device 45 is obviated and that an actuating movement or lifting movement of the actuating member 41 or the actuating device 34 directly influences an actuating movement of the valve closure member 18. It may thus be achieved that when electric current is supplied to the tubular heating element 43, which is realised in particular as a PTC resistor element, the actuating device 34 is shifted from a starting position 57 to the working position, which, due to the immediate action of the contact surface 25 of the plunger 21, leads to a simultaneous initialisation of a closing movement of the valve closure member 18.

This alternative configuration is used, for example, in what is referred to as priority switching arrangements. Priority switching arrangements of this type are provided in heating circuit systems in which the heating water circulated in the heating circuit system is used for the purpose of heating up warm water for daily use via a heat exchanger. Once consumption of warm water is detected, the heating element 43 of the arrangement 11 is energised, such that the valve 12 is closed. Thus, the inflow of heating water into the heating circuit system is interrupted and the heating water for the heating system is supplied to a heat exchanger that heats up the warm water for immediate use or water requirement. Once the warm water requirement ceases, the supply of current to the heating element 43 is stopped and the heating water is re-circulated into the heating circuit system.

The layouts and configurations of the heating element 43 or the heating elements 43 and 44, as well as their variants as described in FIGS. 1 to 5, may also be provided in the arrangement 11 according to FIG. 6. The same is true, by analogy, of the actuating member 41 and its alternative embodiments.

Furthermore, in all embodiments the actuating member 41, instead of being realised as a spring member in the form of a spiral spring or a coil spring, may be realised as a spring member in the form of a disc spring made of a shape memory alloy. Provision may equally be made for spiral springs and disc springs to be arranged in combination with each other so as to act in an axial direction.

The invention claimed is:

1. An arrangement for shifting a valve which has a plunger with a valve closure member subjected to the action of a restoring member, said arrangement having a housing that is attachable to the valve and in which at least one temperature-dependent actuating member that cooperates with an actuating device is arranged and by which said actuating device is activated so as to be movable between a starting position and a working position, wherein the actuating member is realised in the form of at least one spring member made of a shape memory alloy, the actuating member being realised in the form of at least one spiral spring, the actuating member being actuated by at least one heating element in the form of a positive temperature coefficient resistor, which is realised in a tubular or rod-shaped form, the actuating member surrounding the tubular or rod-shaped positive temperature coefficient resistor, wherein the actuating member extends substantially lengthwise with respect to a direction of movement of the actuating device, the actuating device being movable by the actuating member longitudinally in an axial direction of the actuating member within the housing and the actuating device has a peripheral wall comprising a plurality of through holes or apertures, wherein an air exchange is provided between an interior and an exterior of the actuating member and an interior and an exterior of the actuating device and wherein the actuating device has a thrust rim which faces towards a housing portion and which abuts against the housing portion and forms a supporting surface for the plunger, the valve closure member, or a thrust member disposed between the thrust rim and either the plunger or the valve closure member when the actuating device is in the starting position.

2. The arrangement as claimed in claim 1, wherein at least one heating element extending in the interior of the actuating member or at least one heating element associated with the exterior of the actuating member and extending at least partially longitudinally perpendicular to the axial direction of the actuating member is provided.

3. The arrangement as claimed in claim 2, wherein the one heating element that is tubular or rod-shaped or the plurality of heating elements that are tubular or rod-shaped have a total length which corresponds to at least one half of the length of the actuating member when in the starting position.

4. The arrangement as claimed in claim 2, wherein each end-face end of the actuating member has a heating element associated therewith which extends at least partially in a direction of the opposite end-face end of the actuating member.

5. The arrangement as claimed in claim 2, wherein at a bottom of the actuating device the at least one heating element is provided.

6. The arrangement as claimed in claim 2, wherein at least one plate-shaped heating element is provided on the housing portion dividing an interior of the housing.

7. The arrangement as claimed in claim 2, wherein in order to activate an actuating movement of the actuating member, a plate-shaped heating element is formed as an electrical resistor and wherein the tubular or rod-shaped heating element is formed from a thermally conductive material.

8. The arrangement as claimed in claim 1, wherein a restoring device is provided within the housing which acts between a housing cover and the actuating device and disposes the actuating device in the starting position while the actuating member is in an idle state.

9. The arrangement as claimed in claim 8, wherein the restoring device is realised as a spiral spring, acting between the housing cover and the thrust rim of the actuating device, or wherein the restoring device is realised as at least one disc spring, acting between the housing cover and a bottom of the actuating device.

10. The arrangement as claimed in claim 8, wherein the housing cover and the housing portion traversing an interior of the housing have a gap formed therebetween, such that on transferring the actuating device from the starting position to the working position an opening or closing of the valve is provided.

11. The arrangement as claimed in claim 1, wherein the sum of an activable opening force of the actuating member and an actuating force of the restoring member acting in an opening direction of the valve closure member is greater than a restoring force of a restoring device.

* * * * *